United States Patent [19]
Fiedler

[11] 3,816,000
[45] June 11, 1974

[54] THREE AXES ALIGNMENT MEANS

[75] Inventor: George C. Fiedler, St. Louis, Mo.

[73] Assignee: McDonnell Douglas Corporation, St. Louis County, Mo.

[22] Filed: Jan. 24, 1972

[21] Appl. No.: 219,997

[52] U.S. Cl. .................. 356/152, 356/172, 250/204
[51] Int. Cl. ........................................... G01b 11/26
[58] Field of Search .................... 356/152, 141, 172; 250/204

[56] References Cited
UNITED STATES PATENTS

| | | |
|---|---|---|
| 3,302,512 | 2/1967 | Davidson ........................... 356/152 |
| 3,375,750 | 4/1968 | Ellis et al. .......................... 356/152 |
| 3,486,826 | 12/1969 | Colvin et al. ...................... 356/152 |
| 3,603,688 | 9/1971 | Vaniz ................................. 356/152 |
| 3,628,385 | 12/1971 | Ross, Sr. ............................ 356/152 |

*Primary Examiner*—Maynard R. Wilbur
*Assistant Examiner*—S. C. Buczinski
*Attorney, Agent, or Firm*—Charles B. Haverstock

[57] ABSTRACT

Apparatus for accurately aligning equipment such as the electronic and optical direction sensing, direction indicating and direction finding equipment used on air and space vehicles and the like, the apparatus including a laser, beam splitter, and angle sensing detector means positioned to respond to the laser beam energy for producing electrical signal outputs for use in aligning equipment in mutually perpendicular planes representing roll, pitch and yaw, said detector means being able to detect angular deviations about any one or more of the three mutually perpendicular axes. Lateral displacement and angular deviations being relative to an established plane of the laser beams. The subject device has diverse uses including being used to align guidance components and systems, aiming, sighting, tracking and other electronic and optical devices, directional antenna devices and systems, shop tooling fixtures and other applications where precise alignment accuracy of one member with respect to another or with respect to an established frame of reference is required and with less man power being required.

20 Claims, 7 Drawing Figures

THREE AXES ALIGNMENT MEANS

Various alignment and detection devices available commercially, have been used for various purposes including aligning guidance, aiming, sighting and other types of devices and systems. However, none of the known alignment devices is able to provide alignment in three axes simultaneously from a single reference point and with the same degree of accuracy as the present means, no known device or system is able to detect actual angular error or misalignment with respect to three different axes unaffected by the distance from a light source to the component or system being aligned, and no known device is versatile enough to be able to detect linear as well as angular deviations. These and other deficiencies and shortcomings of the prior art are overcome in the present device which, in addition reduces the number of persons and the skill and training required by the person doing the aligning, and at the same time substantially improves the accuracy and precision of the alignment obtained. For the most part, the kinds of devices and systems to be aligned by the present means require a relatively high degree of alignment accuracy, and the present device provides means for accomplishing this.

The present alignment means include a source of coherent light such as a laser light source, the output of which is divided by a beam splitter and associated reflector means or a rhomboid unit beam splitter into two distinct parallel laser rays, one of which is designated the principal ray and the other or split off and reflected ray is the reflex ray. These parallel rays are directed respectively at spaced detector elements, the one receiving and responding to the principal ray producing output responses from which pitch and yaw angular alignment is obtained, and in conjunction with the one receiving and responding to the reflex ray producing output responses from which roll alignment is obtained, pitch, yaw and roll alignments being necessary to align many types of devices and systems. No known device is able to provide simultaneously the same or similar information with the same high degree of precision and accuracy as the present device.

It is therefore a principal object of the present invention to provide improved and more accurate means for aligning devices and systems.

Another object is to provide relatively simple, and easy to operate means for aligning devices with respect to three axes, and for obtaining therefrom accurate information as to angular deviations and lateral displacements.

Another object is to provide three axes alignment means employing a laser light source, which means are independent of the distance from the light source to the device or devices being aligned.

Another object is to provide a more accurate means for aligning systems and devices installed in aircraft and space vehicles with respect to an on board established frame of reference.

Another object is to provide three axes alignment information that is free of inherent visual errors common to optical systems.

Another object is to provide means for aligning simple as well as complex systems by alignment means which can be operated accurately even by persons having relatively little skill and training.

Another object is to provide accurate means for aligning the aiming, guidance, tracking, as well as other optical and radio navigation systems, including the weapons systems, used on air and space vehicles and the like.

Another object is to provide alignment means which make use of the inherent characteristics of lasers such as their ability to produce narrow, monochromatic, collimated light.

Another object is to provide versatile alignment means which include means to split a laser light beam into two parallel beams of substantially the same size, intensity and other characteristics.

Another object is to provide three axes angular detector readout means for use in alignment devices and the like.

Another object is to reduce the number of persons required to align systems and devices.

These and other objects and advantages of the present invention will become apparent after considering the following detailed specification which covers several embodiments thereof in conjunction with the accompanying drawings, wherein:

Figure 1:
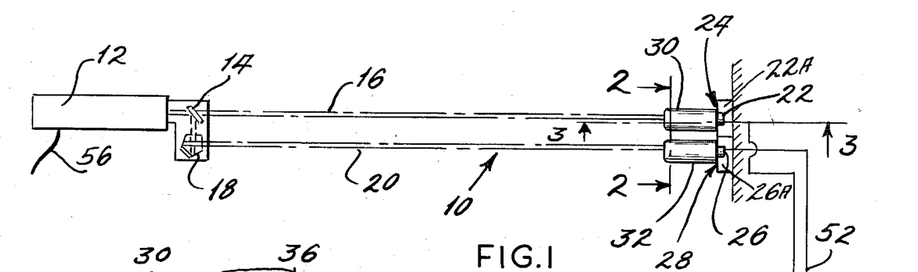
FIG. 1 is a diagramatic sketch showing the basic components of the present device.

Referring to the drawings more particularly by reference numbers, number 10 refers to a three axes alignment device or system constructed according to the present invention. The system 10 includes a laser light source 12, such as a helium-neon (HeNe) gas laser light source which produces a narrow monochromatic, collimated coherent beam or ray of light. The light ray from the source 12 is directed at and impinges on a beam splitter element 14 which is constructed to pass part of the laser light directly therethrough and to reflect part of the light at a right angle. The part of the laser light ray that passes directly through the element 14 is referred to as the primary or principal ray 16, and the part that is reflected impinges on a mirror or prism member 18 and is reflected in a direction parallel to the principal ray 16 and is referred to as the reflex ray 20. The principal and reflex rays 16 and 20 are precisely parallel to each other, a condition that is important to the operation and accuracy of the device 10. This condition is achieved by the proper construction and location of the beam splitter 14 and the mirror 18 including their relationship to each other as an assembly, and to the light source 12. The elements 14 and 18 are preferably a homogeneous optical unit such as an rhomboidal geometric element containing an integral beam splitter and a reflector.

The principal ray 16 is directed at and impinges on a first sensor element 22 located in a first detector assembly 24, and the parallel reflex ray 20 is directed at and impinges on a second sensor element 26 located in a second detector assembly 28. The construction of the detector assemblies 24 and 28 are similar, each including respectively a tubular housing 30 and 32 in which is installed the semi-conductor wafer elements 22 and 26 otherwise known as silicon photodiode cells having associated indexed support means 22A and 26A and electrical connection means which will be described later.

Figure 2:
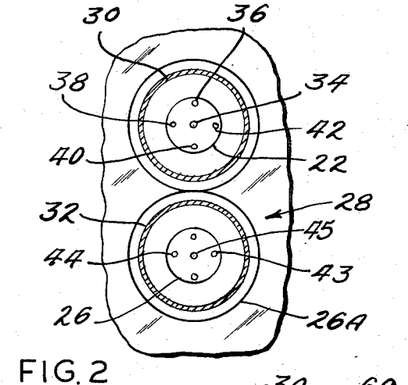
FIG. 2 is a view taken on line 2—2 of FIG. 1 and illustrating where the yaw, pitch and roll outputs are taken.

The sensor 22 on which the principal ray 16 impinges has a plurality of output connections in which signals are produced which are used in aligning with respect to the pitch and yaw axes, and the sensor 26 has similar but possibly fewer output connections in which signals are produced that are used in aligning with respect to the roll axis. The sensors 22 and 26 are of known construction being semi-conductor wafers known as Schottky barrier devices. The sensors 22 and 26 each have five output connections or terminals located as shown in FIG. 2 on the opposite sides thereof from the sides on which the respective laser rays impinge, and differential and/or balanced electric signals are produced at these terminals and transmitted to a display or other meter. The terminals are shown in FIG. 2 arranged on the sensor 22 in opposed pairs 36 and 40 and 38 and 42 with a central terminal 34 also being provided at the locations shown. The sensor 26 is shown having at least the two opposed terminals 43 and 44 at the locations shown and a central terminal 45 may also be provided.

One of the main purposes of the present device is to provide means for quickly and accurately aligning electronic and optical equipment located on devices such as on aircraft, spacecraft as well as on other devices. This has been done in the past primarily by mechanical and optical devices which to a large extent depend for their accuracy on the ability and skill of an operator, with the results obtained varying from operator to operator. Results obtained in this way often also require the preparation of error charts for interpolating the results, and the chances for error and inaccuracy using such devices and procedures is relatively substantial. The requirement of charts, tables and other interpolative data or determining the amount of possible error due to misalignment alone is a substantial disadvantage of the known devices because it not only takes time to interpret the results but it introduces further possibility for error. In large measure these disadvantages and limitations of the known alignment means and techniques are overcome by the present alignment means which produce precise and accurate results that can be read directly without requiring any interpolative data or charts for alignment purposes. This is possible in large part because the present alignment means make advantageous use of the inherent characteristics of laser light rays and of the means available for sensing and locating said rays. This completely eliminates the need to rely on human responses and reactions including human visual responses as well as errors due to parallax and other conditions which effect optical accuracy. Also, the present means, as indicated, eliminates the need for producing interpretive data such as interpolation charts and the like which heretofore have usually been required even for the most precise optical equipment. Furthermore, the present alignment means which use two parallel laser rays, makes possible the obtaining of the same high degree of alignment accuracy with respect to all three axes from a single reference source, uneffected by the distance between the light source and the detectors, and completely free of visual errors. Still further, as will be explained, the present three axes alignment means are of a closed circuit type in the sense that they do not require moving or relocating the aircraft in a particular position when aligning the on board equipment and they do not require target or other means located remotely from the system and/or aircraft being aligned. The present alignment means also preferably employ a relatively low power laser source which can be operated safely without requiring any special protective devices by the person or persons doing the aligning.

The subject alignment means and the alignment technique employed will be described for use in aligning systems and equipment on aircraft, but it is assumed that the same or similar means and techniques can be used to align other types of equipment including equipment located on other kinds of devices including equipment located on space craft, ships, land vehicles or even land anchored equipment, tools and so forth.

When equipment and/or equipment mounts located on an aircraft are to be aligned using the present alignment means, it is first necessary to establish a boresight reference plane on the fuselage with respect to the water line and buttline planes of the airframe to which all of the equipment to be aligned are aligned. The boresight reference plane is usually established between two tooling points located on fore and aft structural members of the aircraft. The reference plane is an imaginary plane that is established parallel to the aircraft's horizontal and vertical reference planes. The alignment procedure which will be described herein takes two steps, the first is to establish the initial boresight reference plane, and the second to align the individual pieces of equipment and/or systems to the established reference plane. Both steps require aligning with respect to the yaw, pitch and roll axes.

Figure 6:
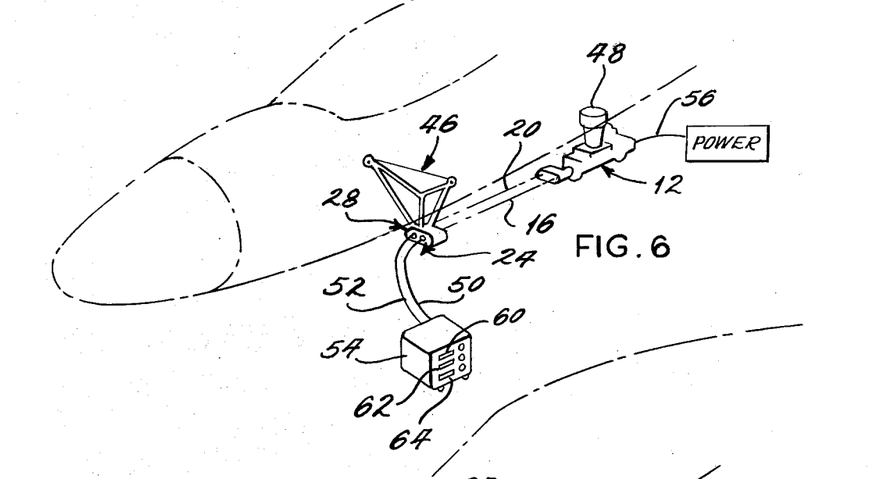
FIG. 6 is a view showing the subject alignment means mounted on an airframe in position to establish initial reference frame alignment; and, FIG. 7 is a view showing the subject system being used to align electrical and/or optical equipment located at remote locations in an aircraft relative to an established aircraft reference plane such as equipment located in the cockpit.

The initial alignment step requires installing the detectors 24 and 28, including the assemblies or fixtures in which they are installed at their respective positions on the airframe. At another relatively distant point therefrom the laser source 12 including the beam splitter portions 18 are installed. The detectors and laser source are used to establish the boresight reference plane which is an imaginary plane jig located during construction of the airframe (FIG. 6). In practice this is accomplished by providing a reference plane alignment fixture 46 on which the detector assemblies 24 and 28 are mounted, and another mounting assembly or fixture 48 on which the laser light source 12 is mounted. The fixtures 46 and 48 are shown located at or near the under side of the fuselage although they could be at other locations inside or outside of the skin of the aircraft, if desired. The laser light source 12 in the embodiment shown in mounted rearwardly of the detector assemblies 24 and 28 for convenience because usually all of the devices to be aligned are located at or near the front end of the aircraft. This means that all of the various devices to be aligned can be aligned without having to relocate and/or readjust the laser source 12 once the initial reference plane is established.

In order to establish the initial reference plane and thereafter to align the equipment, the connections to each of the detectors are connected by associated cables 50 and 52 to various inputs of a null meter 54, and the laser light source 12 is connected by other leads 56 to a suitable power source. The mounting fixture 48 also includes means for moving or adjusting the angular position of the light source 12 relative to the positions of the sensor elements 22 and 26 to establish the initial alignment conditions. It is usually only necessary, however, that the fixture 48 for the laser 12 be adjustable, assuming that the fixture 46 for the sensors is properly located with respect to the reference plane at the time the airframe is made. Ordinarily this is not a disadvantage since all equipment in any case is aligned to the same reference plane so that even if the airframe is off to a certain extent no substantial harm will result. The positions of the laser rays are then adjusted by adjusting the position of the fixture 48 with respect to each of the three axes individually, the alignment of each axis being indicated by obtaining a null reading on the associated scale of the meter 54 as will be explained. Once this is done during the first alignment step, the boresight reference plane is established. Thereafter, the detectors 24 and 28 can be removed from the fixture 46 and installed in other similar fixtures which are attached to or associated with the various pieces of equipment or systems to be aligned. This is done without disturbing the established positions and orientations of the laser rays 16 and 20 from the source 12. A typical aircraft may have several pieces of equipment that need aligning such as electronic equipment, gyro equipment, optical equipment, antenna devices and systems and other related devices. All such equipment are aligned to or with respect to the same boresight reference plane and therefore to each other, and this is done without the need for producing any interpretive or extrapolative data. Alignment of the different equipment pieces and systems is accomplished by mounting the detectors 24 and 28 on each of the mounting fixtures associated with each device and systems to be aligned and adjusting the positions of the said fixtures, which also adjusts or gages the equipment mount platform connected thereto, to produce the necessary null readings on the meter 54 for each of the three axes. After the null readings are obtained in each case the associated mount is locked in position or shimmed accordingly so the thereafter attached equipment will remain in alignment. The construction of the detectors 24 and 28 are such as to enable accurate pinpointing of the location thereon where the laser rays 16 and 20 impinge, and the results obtained in this way are more accurate and reliable than can be obtained using current known mechanical and/or visual-optical means, and furthermore, the results obtained using the subject means do not depend upon the visual or other abilities of the operator. Still further, a single person can perform the entire alignment procedure using the present device because he does not have to receive direction from another person observing the alignment through an eyepiece. He merely observes the scale readings of the null meter and performs the alignment accordingly. It has been verified in test that a component can be aligned using the present means to an accuracy of less than 0.1 milliradian, and this accuracy can be achieved regardless of the distance between the light source and the detectors within reasonable distance limitations. This is because of the sensitivity of the photo-diode sensors to electrically sense the position of the centroid of the laser beam relative to its electrical null without regard to the intensity of the laser light rays or distance between the laser and the detectors. This fact also makes it possible to use a relatively weak laser source, preferably one which cannot possibly injure the person doing the aligning. A typical laser source that has been used with the present device is a 1.3 milliwatt laser source that produces an output ray that is expanded and collimated to about a 10 millimeter diameter ray. It is therefore a simple and safe matter for a single operator to accurately align all of the equipment on an aircraft or other device using the subject means, and he can accomplish this relatively easily and in less time than with the present available optical and mechanical means. This is possible because he can move the null meter 54 to any convenient place near the fixture being aligned. After each piece of equipment is aligned and locked in its aligned position the detectors are moved to the fixture associated with the next piece of equipment to be aligned and the process repeated until all of the devices to be aligned are in alignment using the same two parallel laser rays.

The sensor elements 22 and 26 are sensitive silicon photodetectors that provide two electrical signals relative to the position of the input light energy to fixed internal coordinates. The outputs produced by such devices when exposed to the laser rays can be adjusted to null conditions to a very high degree of accuracy.

Figure 4:
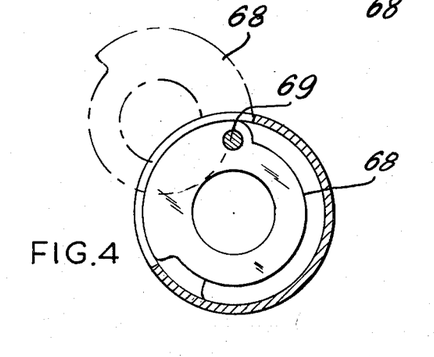
FIG. 4 is a view taken on line 4—4 of FIG. 3 showing the lens system in inoperative position in dotted outline.

With only one laser ray, the principal ray, and one sensor, such as the sensor element 22, the present device would only establish alignment with respect to two axes, namely the pitch and yaw axes. With the addition of the parallel reflex ray 20 and the second sensor element 26, however, it is possible to also establish alignment with respect to the roll axis. FIG. 2 shows that the yaw axis alignment is established when the principal ray 16 is located midway between the two horizontal sensor connections 38 and 42. This condition can be established at any point along a vertical line equidistant from these connections. In similar manner the pitch axis null condition is established when the ray 16 is at any position that is equidistant from the sensor connections 36 and 40. To achieve pitch and yaw angular alignment a collimating lens system 66 is provided to focus the principal ray 16 so that it impinges at the center of the sensor 22 equidistant from both pairs of detector pin connectors. The lens system 66 is part of an assembly 68 which is pivoted at 69 to the tube 30 associated with the sensor 22 and can be swung to the non-operative position shown in dotted outline in FIG. 4 when aligning with respect to the roll axis.

Referring again to FIG. 1, the reflex ray 20 is shown spaced below the principal ray. This is done for convenience only because it could be spaced from the principal ray in any desired parallel position. Once the location of the reflex ray 20 relative to the principal ray is established all equipment being aligned will be aligned with respect to an imaginary plane that includes both of the rays. Therefore, during the alignment of each device, three separate and distinct null conditions must be met to satisfy the correct relationship to the parent object. Yaw and pitch null is obtained as previously stated, with roll obtained as a differential signal from both sensors 22 and 26. A roll null condition exists when the principal ray 16 and the reflex ray 20 are simultaneously equidistant from their respective sensor electrodes. That is, the energy centroid or position of the ray 16 must be the same distance from electrode 42 of sensor 22 as the energy centroid or position of the reflex ray 20 is from the corresponding electrode 43 of sensor 26, and so forth for all of the other electrodes. Under these conditions corresponding electric signals from both of the sensors 22 and 26 will be equal and therefore will cancel out when fed to means to establish a differential signal resulting in a null condition which corresponds to or signifies roll axis alignment.

The meter 54 includes three separate nulling dials or gages including dials or gages 60, 62 and 64. The dials 60 and 62 are nulled in aligning for pitch and yaw and include scales and pointers that indicate the signal outputs received from the sensor 22 in microamperes, and the dial 64 includes means for producing a differential microamp signal which is based on the sum (or difference) of outputs received from both of the sensors 22 and 26. This, as stated, is a measure of the roll alignment and takes into account detector signals produced by exposure to both of the laser beams 16 and 20.

It should be recognized that the lens assembly 66 is only needed when aligning for pitch and yaw, and when so used it is unimportant where on the lens 66 the principal ray 16 impinges as long as the principal ray is oriented perpendicular to the plane (or parallel to the axis) of the lens system. The important thing is that its centroid be focused at the center (location equidistant from all of the electrodes 36, 38, 40 and 42) in order to accurately establish yaw and pitch alignment. This will only be true if the principal ray 16 is oriented as indicated, a well known optical phenomenon. If the principal ray 16 is tilted at some angle relative to the axis of the lens system, its centroid will no longer impinge at the center of the detector 22 indicating a pitch and/or a yaw misalignment. Thereafter, when the lens system is moved out of the operative position for roll alignment, it is possible that the principal ray 16 may impinge on the detector 22 at some location other than at the center or axis of the detector 22 as in the case of pitch and yaw alignment, in which case roll alignment will only be indicated if the signals produced at the respective outputs of the two detectors 22 and 26 are the same, and therefore cancel each other when fed to a means for determining the difference therebetween.

Figure 5:
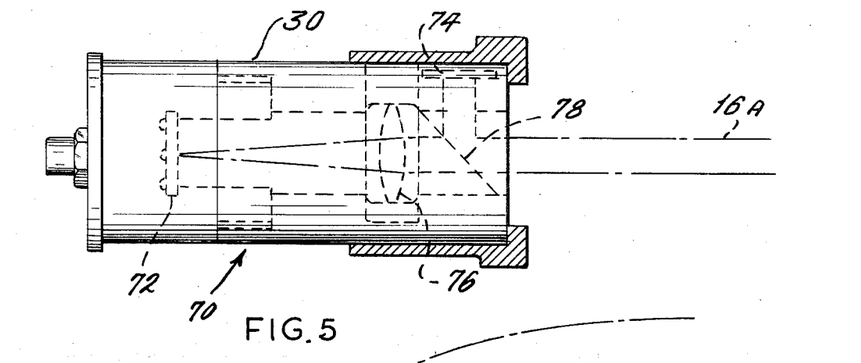
FIG. 5 is a view similar to FIG. 3 but showing a somewhat different form of the device.

FIG. 5 shows a modified form of sensor assembly 70 which includes two photodiode cells 72 and 74. The modified assembly 70 also has a lens system 76 similar to the lens system 66. Positioned ahead of the lens 76 in the path of the incoming laser ray 16A is located a beam splitter element 78 which may be in the form of a sheet or film such as a well known pellicle film. Part of the principal laser ray 16A passes through the beam splitter film 78 and is focused by the lens 76 into a spot that impinges on the cell 72. Another part of the incoming ray 16A is reflected by the beam splitter action of the film 78 and impinges on the second photodiode cell 74 which is oriented at a right angle relative to the detector 72. In the modified structure 70 the cell 72 serves the same purpose and is constructed similarly to the cell 22 in FIGS. 1-3, and in this structure the second cell 74 serves the same purpose as the cell 26 when the lens is rotated to the inoperative position, as previously described, and is used in conjunction with the detector 72 to produce a null condition necessary to align for the roll axes. The use of a pellicle or pellicle-like film is preferred in this construction because such films are very thin and therefore do not displace or produce a detectable double image reflection when acting as a beam splitter. This is important to the accuracy of the present device for obvious reasons.

Figure 3:
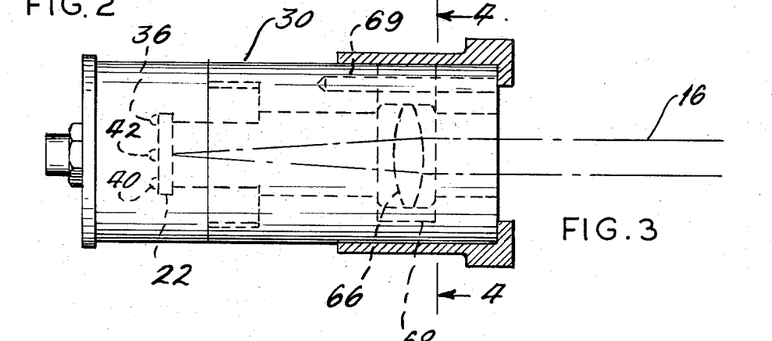
FIG. 3 is an enlarged cross-sectional view taken on line 3—3 of FIG. 1.

The detector means shown in FIG. 5 has identical functions to that shown in FIG. 3, differing from it only in application. Both, for example, are used in conjunction with one of their detectors (detectors 22 and 72) to align with respect to pitch and yaw, and with respect to detectors 26 or 74, respectively, to determine roll error or roll alignment. In the modified construction shown in FIG. 5, however, the detector or sensor 74 is electrically connected to the roll scale or segment of the null meter 54 and at that time the detector or sensor 72 is inoperative. Likewise, when the sensor 72 is switched in electrically to register pitch and yaw on their respective scales, the sensor 74 is made inoperative. The modified structure is therefore somewhat different in operation from the device of FIG. 3, and represents an improved means for converting from its pitch and yaw signals to its roll signal. Also, in the modified structure the detector can be more easily hermetically sealed which is an advantage in some situations.

FIG. 6 shows the various components of the present alignment means installed in operative positions on an airframe. The detector assemblies 24 and 28, which may be parts of the assembly or unit, are shown mounted on the forward fixture 46 which is attached to the airframe and is used to establish the reference plane which, as explained, is a plane that passes through or is determined by laser rays 16 and 20. FIG. 6 therefore illustrates the apparatus required to perform the initial alignment step necessary to establish the reference plane relative to the airframe. Thereafter, the laser source need not again be moved or adjusted and the detector assemblies 24 and 28 are located on various other fixtures similar to the fixture 46, but used instead to adjust the mounts of the various equipment components and systems to be aligned. The other fixtures, of which there may be any number, are located at different places on the airframe and during alignment when the detector assemblies 24 and 28 are mounted on them, are adjusted to reestablish the same three meter null conditions necessary for three axes alignment. In each case, this requires that the person performing the aligning establish a condition of the two detectors 24 and 28 in which they are perpendicular with respect to the laser rays for yaw and pitch alignment and then establish the null conditions necessary for roll axis alignment, moving the lens system to its inoperative position for this latter step. Different meter switches can be provided to activate each of the meter dials individually and also to activate other necessary circuits to perform signal subtractions and so forth. In order to obtain the three null conditions and thereafter to lock them in threaded adjustment, means such as shimming means and/or other such means or combinations thereof are used to lock the associated mounts in their aligned conditions. This is usually done without the piece of equipment installed thereon. After this is accomplished for each of the various mounts, all of the equipment mounts and the equipment mounted thereon will be aligned to the same three axes and to each other. The accuracy of the alignment obtained will be such that it will be possible to take readings directly from the equipment and/or from the mount settings for comparison or use with similar readings for another piece of equipment or mount, and all such readings will be accurate to within the tolerance capabilities of the aligned equipment itself. This can be accomplished without requiring any interpolative or other information or charts to make corrections for alignment inaccuracies. This means that the user can rely on direct readings from the settings of the various pieces of aligned equipment, and can verify the results obtained on one aligned device with readings from another by direct comparisons. The advantages of being able to do this in terms of accuracy and time saved are substantial.

Figure 7:
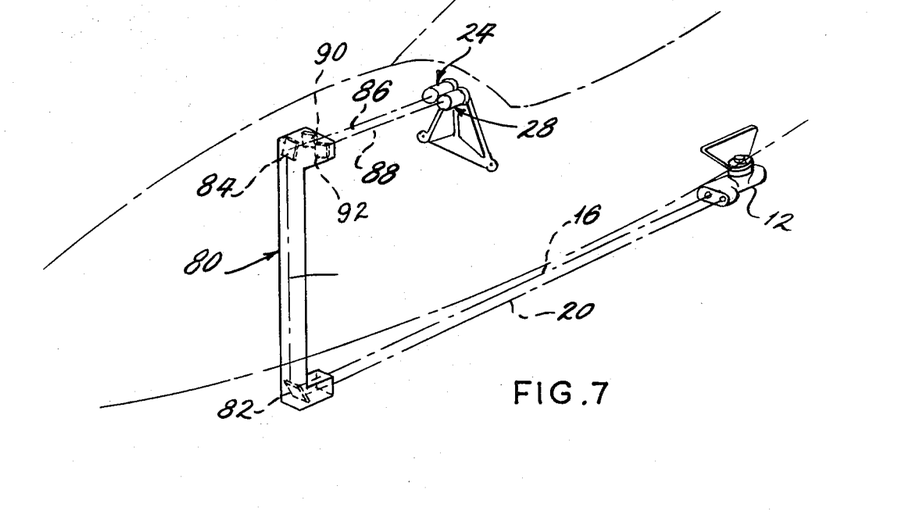

FIG. 7 is somewhat similar to FIG. 6 but differs mainly because it shows the subject alignment means being used to align electronic and/or optical equipment located at places relatively remote from the reference plane as established by the parallel rays. For example, the construction of FIG. 7 can be used to align devices located in the cockpit using a laser source located at or near the bottom of the aircraft. This is accomplished in the structure of FIG. 7 but by using intermediate periscope-type means 80 which include spaced reflector means 82 and 84 as well as other means at the locations shown to establish the parallel rays or beams 86 and 88 respectively, which establish the new plane in space. The reflector means 84 is shown associated with beam splitter means 90, which may be a pellicile film, and also with a second reflector 92. This enables aligning the equipment without effecting any change in the position of the laser source 12 itself, and without effecting the initial reference plane. The means to accomplish this are basically the same as before, the main difference being in the provision of the periscope means 80 and the associated reflectors 82, 84 and 92 and the beam splitter means 90. In this case only the principal ray 16 passes through the periscope means 80 and is split by the beam splitter means 90 located at the location as shown which is remote from the original plane as described above. Only the principal ray 16 need pass through the periscope means 80 because of the location of the beam splitter means 90. This is an advantage because it is usually easier and more practical to locate the beam splitter means at the remote location where the reference plane is to be established than to double reflect both of the beams 16 and 20, although this could be done. The sensor unit, including the sensors 22 and 26 and the meter 54, are used in the same way for the modified structure of FIG. 7 as for the other embodiments to establish the three necessary null conditions. A separate mounting fixture should also be provided on the frame of the aircraft for mounting the periscope means 80 if such is used.

Thus there has been shown and described novel, more accurate means for aligning electrical, electronic, direction finding and optical equipment and devices including aligning such devices with respect to three different mutually perpendicular axes relative to an established reference plane, which alignment means fulfill all of the objects and advantages sought therefor. Many changes, modifications, variations, and many other uses and applications of the present alignment means will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A device for aligning electronic, mechanical, and optical devices with respect to an established reference plane in space comprising a source of collimated laser light, means for splitting the collimated light into two parallel collimated light rays, the light splitter means including beam splitter and beam reflector means, light sensing detector means mounted in spaced relationship to said light source in position to have the two parallel collimated light rays impinge thereon, said detector means including a pair of spaced wafer-like detector elements each having at least one pair of spaced electrodes at which respective electric responses are produced that vary with the position where the respective parallel light ray impinges thereon, collimating lens means associated with one of said pair of detector elements to focus the said respective light rays thereon, said lens means being constructed to focus all parallel positions of the one light ray of said respective light rays parallel to the optical axis of the lens means to impinge the same location on the detector element, and means for moving said lens means to an inoperative position out of optical alignment with said one detector element, means operatively connected to one pair of the spaced electrodes on one of said detector elements including means for establishing a null condition when the respective light ray impinges thereon equidistant between one of the pairs of spaced electrodes, means operatively connected to another pair of spaced electrodes on said one detector element including means to establish a null condition when the same light ray impinges equidistant between said other pair of spaced electrodes, means operatively connected to corresponding pairs of spaced electrodes on said first and on said second detector elements including means operable when the lens means is in its inoperative position to establish and indicate a third null condition when the signal responses received from the electrodes of said first and second detector elements are the same, means for adjusting the position of the detector means relative to the parallel collimated light rays to establish a predetermined angular relationship therebetween, means for relocating the detector means on a device to be aligned irrespective of the distance from said device to be aligned to the light source, and means for adjusting the position of the said device to be aligned and of the detector means located thereon to reestablish the same aforesaid predetermined relationships between the detector means and the collimated light.

2. The device defined in claim 1 wherein the light splitter is a rhomboid-type beam splitter.

3. The device defined in claim 1 wherein the detector means includes a first portion positioned to respond to one of the two parallel collimated light rays and a second portion spaced from the first portion and positioned to respond to the other of said two parallel collimated light rays.

4. The device defined in claim 3 wherein said first detector portion includes a light sensitive wafer element constructed of solid state materials and including output connector means, said wafer element being constructed to produce electric energy outputs at the output connector means which vary with the position on the wafer element where the associated light ray impinges.

5. The device defined in claim 4 wherein said second detector portion includes a light sensitive wafer element positioned to be exposed to the other of said parallel light rays, said second detector portion having at least one pair of spaced connectors.

6. The device defined in claim 3 wherein said first and said second detector portions each have corresponding output connector means at which electric signal responses are produced when the respective parallel light rays impinge thereon, and means for comparing the electric signal responses produced at respective ones of the said connector means associated with the first detector portions with the electric signal responses produced at the corresponding output connector means associated with the second detector portion, correspondence between said compared electric signal responses being necessary to establish roll angle alignment between the detector means and the established reference plane in space.

7. A device for aligning and orienting direction finding devices and the like with respect to three mutually perpendicular axes representing, respectively, yaw, pitch and roll comprising means for establishing a reference plane in space including a source of substantially non-diverging collimated laser light forming a line of light in space, means for splitting said line of light to produce a second substantially similar parallel line of collimated laser light, said two parallel lines of light establishing a reference plane in space, detector means spaced from said light source having separate spaced first and second light sensitive portions each including a plane surface positioned to be exposed respectively to said parallel lines of light, each of said spaced light sensitive portions having a plurality of spaced output connection locations at which electric signals are produced when the respective line of light impinges thereon, lens means positioned in the path of the line of light that impinges on said first detector portion, said lens means operating to focus all positions of the line of light impinging thereon that are parallel to the axis of the lens onto the same location on the said first detector portion, said first detector portion having pairs of spaced output connection locations at which electric signals are produced to represent respectively pitch and yaw, the signals produced at each of said connection locations varying with the distance between where the line of light impinges on the associated detector portion relative to the respective connections, the output signals produced at selected pairs of the connection locations of said first of said light sensitive detector portions having components which vary with the pitch and yaw angular relationships of the respective line of light relative to the plane of the plane surface of the said first light sensitive detector portion, said lens means being movable to an inoperative position out of the path of said one line of light, and other means for differentially combining electric signals produced at selected ones of the output connection locations of said first light sensitive detector portion with the electric signals produced at corresponding output connection locations of the second light sensitive detector portion when the lens means are in their inoperative position to produce differential signal responses which are indicative of roll axis alignment.

8. The device for aligning and orienting defined in claim 7 including a multidial meter and means connecting said meter to selected ones of the output connection locations of said first and second light sensitive detector portions, said meter having a first dial adapted to respond to output signals produced at one of the pairs of spaced connection locations of said first light sensitive detector portion to establish an indication of alignment accuracy with respect to the yaw axis, a second dial adapted to respond to output signals produced at another of said pairs of connection locations of said first light sensitive detector portion to establish an indication of alignment accuracy with respect to the pitch axis, and a third dial responsive to the differential combined output signals produced by the corresponding pairs of connection locations on said first and second light sensitive detector portions to establish an indication of alignment accuracy with respect to the roll axis.

9. The device for aligning and orienting defined in claim 7 wherein said spaced detector portions include metal semi-conductor wafer-type photodiode detectors, each of said detectors having a central surface area formed on the plane surface thereof for exposure to the respective parallel lines of collimated laser light, said plurality of spaced connection locations on each of said detectors including pairs of opposed connection locations located on opposite sides of the central surface area.

10. The device for aligning and orienting defined in claim 9 including means for establishing a predetermined angular relationship between the plane in space and the plane surfaces of the first and second detector portions including an electric meter having a first scale and means operatively connecting said first scale to a first pair of spaced connection locations on said first detector portion, a second meter scale and means operatively connecting said second scale to another of said pairs of spaced connection locations on said first detector portion, said first and second pairs of spaced connection locations being angularly related at right angles to each other on the said one detector portion, and a third meter scale and means operatively connecting said third scale to correspondingly oriented selected pairs of said spaced connection locations on said first and said second detector portions, said third meter scale responding to the difference between the signals it receives from the first and second detector portions.

11. The device for aligning and orienting defined in claim 7 including separate means for mounting each device to be aligned and oriented, each of said separate mounting means including means for mounting the detector means, and means associated with each of said separate mounting means for adjusting the position of the detector means when the detector means are mounted thereon to align and orient the said mounting means and the device to be mounted thereon with respect to three mutually perpendicular axes.

12. A three axes alignment device comprising a laser light source capable of producing a narrow beam of coherent collimated light, said source including means to split the beam into two similar parallel beams approximately equal in intensity, first and second spaced beam responsive detectors constructed to respond to light impinging thereon from the respective parallel beams and to produce electric signals whose characteristics correspond to the locations on said detectors where the respective beams impinge, means for establishing a particular location and orientation in space of the two parallel beams, said beams thereby establishing a plane in space, and means spaced from the light source for mounting a particular device to be aligned with respect to three axes as determined by the established plane in space, said mounting means including means for locating said first and second detectors in position to be exposed respectively to the two parallel light beams, a lens system including a lens associated with said first detector, said lens system having an optical axis and said lens being movable between an operative position in which the associated beam of light passes through the lens to impinge on said detector and an inoperative position in which the lens is out of optical communication with the said beam of light, the operative position of said lens causing the associated beam of light impinging thereon to impinge at the same location on the said first detector only so long as the beam is parallel to the optical axis of the lens system, means associated with the first detector when the lens system is in operative position to establish alignment with respect to two mutually perpendicular axes, means for combining corresponding responses from said first and second detectors when the lens system is in inoperative position for producing alignment indications with respect to a third axis, said mounting means including means to adjust the position thereof and of the detectors located thereon to relocate the detectors to reestablish the same particular angular relationship thereof with the respective light beams and with respect to the established plane in space.

13. The three axes alignment device defined in claim 12 wherein the laser light source is a relatively low output helium-neon gas laser source.

14. The three axes alignment device defined in claim 12 wherein the first and second detectors include semiconductor analog error signal photodiode detector cells.

15. The three axes alignment device defined in claim 12 including a meter having separate dial indicator means operatively connected to selected ones of the first and second detectors, each of said separate dial indicator means being capable of being adjusted to produce a different distinct null condition to represent alignment with respect to a different one of three mutually perpendicular axes.

16. The three axes alignment device defined in claim 12 wherein the first and second detectors have plane surfaces on which the respective light beams impinge, the plane surfaces of said first and second detectors being oriented to be parallel to each other and perpendicular to the associated light beams when in proper alignment.

17. A three axes alignment device comprising a laser light source capable of producing a narrow beam of coherent collimated light, means for dividing the beam into first and second parallel beam portions, means including a relatively thin film having beam splitting characteristics positioned at an angle of 45° in the path of the first parallel beam portion of coherent collimated light to split the said first beam portion into angularly related portions, first and second spaced beam responsive detectors constructed to respond to light impinging thereon to produce electric signals whose characteristics correspond to the locations thereon where the respective beam portions impinge, means locating said first detector in position to receive the portion of the first parallel beam portion that passes directly through the beam splitter film, the second detector being positioned to receive the portion of the first parallel beam portion split off at an angle relative to the first beam portion of coherent collimated light, said first and second detectors each having a plane surface exposed to the respective beam portions impinging thereon, a third detector positioned to receive the second parallel beam portion, and means spaced from the light source for mounting a particular device to be aligned, said mounting means including means for locating said first, second and third detectors and the beam splitting film associated therewith in position so that the first parallel beam portion impinges on the beam splitting film and the second parallel beam portion impinges on the third detector, means operatively connected to the first detector and responsive to selected electric signals produced therein to produce an indication as to angular alignment with respect to one axis, other means operatively connected to the first detector and responsive to other selected electric signals produced therein to produce an indication as to angular alignment with respect to a second axis perpendicular to the said one axis, and means operatively connected to the second and third detectors to produce responses which are combinations of electric signals produced thereat when the respective parallel beam portions impinge thereon to produce an indication as to angular alignment with respect to a third axis, said mounting means including means to adjust the position thereof and the position of the detectors located thereon to relocate the detectors to reestablish a particular angular relationship thereof with respect to the respective parallel light beam portions impinging thereon.

18. The three axes alignment device defined in claim 17 wherein said beam splitting film is a relatively thin pellicle film.

19. The three axes alignment device defined in claim 17 including lens means positioned between the beam splitting film and the first detector to focus the beam portion that passes directly through the beam splitting film onto the first detector.

20. The three axes alignment device defined in claim 17 including means to select between operation of the device to align with respect to pitch, yaw and roll.

* * * * *

UNITED STATES PATENT OFFICE
CERTIFICATE OF CORRECTION

Patent No. 3,816,000  Dated June 11, 1974

Inventor(s) George C. Fiedler

It is certified that error appears in the above-identified patent and that said Letters Patent are hereby corrected as shown below:

Column 13, line 37, after "low" insert "power".

Signed and sealed this 17th day of September 1974.

(SEAL)
Attest:

McCOY M. GIBSON JR.  C. MARSHALL DANN
Attesting Officer  Commissioner of Patents